(12) United States Patent
Nishida et al.

(10) Patent No.: US 11,628,733 B2
(45) Date of Patent: Apr. 18, 2023

(54) CHARGEABILITY PRESENTING METHOD AND CHARGEABILITY PRESENTING SYSTEM

(71) Applicant: Panasonic Intellectual Property Management Co., Ltd., Osaka (JP)

(72) Inventors: Yoichi Nishida, Osaka (JP); Tetsuro Sawai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 17/351,502

(22) Filed: Jun. 18, 2021

(65) Prior Publication Data

US 2021/0309117 A1    Oct. 7, 2021

Related U.S. Application Data

(63) Continuation of application No. 16/788,511, filed on Feb. 12, 2020, now Pat. No. 11,065,969, which is a (Continued)

(30) Foreign Application Priority Data

Mar. 3, 2017   (JP) .............................. JP2017-040361

(51) Int. Cl.
*H04B 3/36*       (2006.01)
*B60L 53/124*   (2019.01)
(Continued)

(52) U.S. Cl.
CPC ........... *B60L 53/124* (2019.02); *B60L 53/126* (2019.02); *G08G 1/145* (2013.01); *Y02T 10/70* (2013.01);
(Continued)

(58) Field of Classification Search
CPC ..... B60L 53/124; B60L 53/126; G08G 1/145; Y02T 10/70; Y02T 10/7072; Y02T 90/12;
(Continued)

(56) References Cited

U.S. PATENT DOCUMENTS 9,802,490 B2 * 10/2017 Mita ..................... B60L 53/124
10,140,866 B2   11/2018 Nishida
(Continued)

FOREIGN PATENT DOCUMENTS

JP    2011-215703 A    10/2011
JP    2012-257404 A    12/2012
(Continued)

OTHER PUBLICATIONS

Allowed Claims for Parent U.S. Appl. No. 16/788,511, filed Feb. 12, 2020.
(Continued)

*Primary Examiner* — Tai T Nguyen
(74) *Attorney, Agent, or Firm* — Renner, Otto, Boisselle & Sklar, LLP

(57) ABSTRACT

A chargeability presenting method which includes before start of transmitting first electric power to an electric vehicle, wirelessly supplying second electric power to a charging space, detecting whether heat is generated by a foreign object in the charging space after the second electric power is transmitted, and before start of transmitting the first electric power, presenting chargeability information that is generated based on vehicle presence information and foreign object information, the vehicle presence information indicating whether the charging space is vacant, and the foreign object information indicating whether the heat is detected in the charging space.

5 Claims, 11 Drawing Sheets

Related U.S. Application Data continuation of application No. 16/166,122, filed on Oct. 21, 2018, now Pat. No. 10,607,487, which is a continuation of application No. 15/901,215, filed on Feb. 21, 2018, now Pat. No. 10,140,866.

(51) Int. Cl.
  *B60L 53/126* (2019.01)
  *G08G 1/14* (2006.01)
(52) U.S. Cl.
  CPC ............ *Y02T 10/7072* (2013.01); *Y02T 90/12* (2013.01); *Y02T 90/14* (2013.01)
(58) Field of Classification Search
  CPC  Y02T 90/14; Y02T 90/16; H02J 50/80; H02J 7/0047; H02J 7/025
  USPC ........................................................ 340/471
  See application file for complete search history.

(56) References Cited

U.S. PATENT DOCUMENTS

| | | | |
|---|---|---|---|
| 10,607,487 B2 | 3/2020 | Nishida | |
| 2011/0074346 A1 | 3/2011 | Hall | |
| 2011/0213656 A1 | 9/2011 | Turner | |
| 2012/0236149 A1 | 9/2012 | Nagy | |
| 2012/0280653 A1* | 11/2012 | Prosser | ................ B60L 53/665 320/109 |
| 2014/0015329 A1 | 1/2014 | Widmer | |
| 2014/0097671 A1 | 4/2014 | Nakamura | |
| 2014/0176348 A1 | 6/2014 | Acker | |
| 2014/0203629 A1 | 7/2014 | Hoffman et al. | |
| 2015/0278038 A1 | 10/2015 | Halker | |
| 2015/0323694 A1 | 11/2015 | Roy | |
| 2015/0364944 A1 | 12/2015 | Garcia | |
| 2016/0243948 A1 | 8/2016 | Asai | |
| 2016/0272071 A1 | 9/2016 | Taniguchi | |
| 2016/0297312 A1 | 10/2016 | Tsukamoto | |
| 2018/0058085 A1 | 3/2018 | Katanoda | |
| 2018/0118045 A1 | 5/2018 | Gruzen | |
| 2018/0166928 A1 | 6/2018 | Wu | |
| 2018/0166929 A1* | 6/2018 | Sawai | ...................... G01V 3/10 |
| 2018/0257500 A1 | 9/2018 | Ashby | |
| 2018/0342907 A1 | 11/2018 | Dimke | |
| 2019/0210480 A1 | 7/2019 | Alves | |
| 2019/0275904 A1 | 9/2019 | Matsuo | |

FOREIGN PATENT DOCUMENTS

| | | |
|---|---|---|
| JP | 2013-225969 A | 10/2013 |
| JP | 2015-164368 A | 9/2015 |
| JP | 2016-511393 A | 4/2016 |
| JP | 2017-028953 A | 2/2017 |
| JP | 2017-034733 A | 2/2017 |
| WO | 2014/157092 A1 | 10/2014 |

OTHER PUBLICATIONS

The Extended European Search Report dated Jul. 20, 2018 for the related European Patent Application No. 18157567.1.

* cited by examiner

FIG. 8A
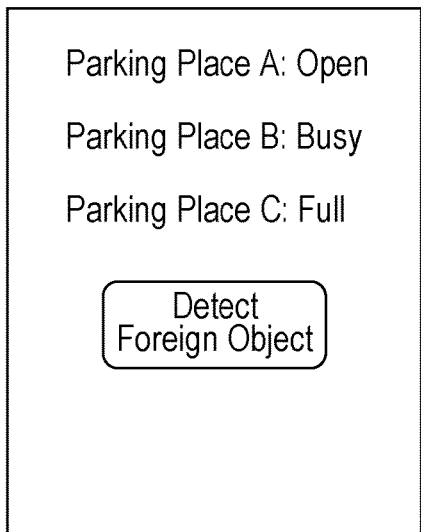
FIG. 8B
|  | Vehicle Absent | — | Vehicle Present |
|---|---|---|---|
| Parking Place A | 10 |  | 2 |
| Parking Place B | 5 |  | 5 |
| Parking Place C | 0 |  | 4 |
FIG. 9A
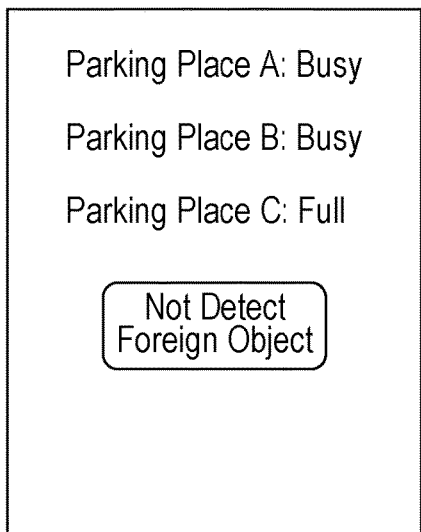
FIG. 9B
|  | Vehicle Absent | Foreign Object | Vehicle Present |
|---|---|---|---|
| Parking Place A | 3 | 7 | 2 |
| Parking Place B | 4 | 1 | 5 |
| Parking Place C | 0 | 0 | 4 |

CHARGEABILITY PRESENTING METHOD AND CHARGEABILITY PRESENTING SYSTEM

This is a continuation of U.S. application Ser. No. 16/788,511, filed on Feb. 12, 2020, now U.S. Pat. No. 11,065,969, which is a continuation of U.S. application Ser. No. 16/166,122, filed on Oct. 21, 2018, now U.S. Pat. No. 10,607,487, which is a continuation of U.S. application Ser. No. 15/901,215, filed on Feb. 21, 2018, now U.S. Pat. No. 10,140,866, the entire contents of which are incorporated herein by reference.

BACKGROUND

1. Technical Field

The present disclosure relates to a chargeability presenting method and a chargeability presenting system that present whether or not an electric vehicle is chargeable in a vehicle parking place where a charger for wirelessly charging vehicles is installed.

2. Description of the Related Art

The "vehicles" as used herein and in the appended claims refer to any moving objects (including two-wheeled vehicles and so on). The "vehicle parking place" as used herein and in the appended claims refers to an area where arbitrary moving objects (including two-wheeled vehicles and so on) can be parked. The "electric vehicles" as used herein and in the appended claims refer to any electric-power-driven moving objects (including two-wheeled vehicles and so on) among vehicles.

For example, electric vehicles that travel on electric power stored in batteries have made an appearance. Although there are cases in which the batteries in the electric vehicles are charged through connection to electrical lines by using plugs, vehicle manufacturers and so on are nowadays developing, as essential technologies for next-generation electric vehicles, technologies for wirelessly charging electric vehicles without connection to the electrical lines, and have also started making efforts for standardizing the technologies.

Japanese Unexamined Patent Application Publication No. 2011-215703 discloses a vehicle-parking location guiding technology that obtains information indicating a charging efficiency when a vehicle is wirelessly charged in practice and that gives guidance indicating the location of a wireless charging facility in conjunction with the information indicating the charging efficiency.

SUMMARY

With the related technology, a user of an electric vehicle can recognize the charging efficiency in a vehicle parking place. However, there are cases in which an electric vehicle cannot be charged in the vehicle parking place since another electric vehicle has already occupied the charging facility or a metallic foreign object is present therein. In particular, for an electric vehicle in which the remaining battery charge is low, it is important that charging can be performed in a vehicle parking place to which the electric vehicle is heading.

One non-limiting and exemplary embodiment provides a chargeability presenting method and a chargeability presenting system that make it possible to recognize the vacancy state of a charging space, that is, to recognize whether or not a parking place of interest is a parking place from which electric power can be received.

In one general aspect, the techniques disclosed here feature a chargeability presenting method which includes before start of transmitting first electric power to an electric vehicle, wirelessly supplying second electric power to a charging space, detecting whether heat is generated by a foreign object in the charging space after the second electric power is transmitted, and before start of transmitting the first electric power, presenting chargeability information that is generated based on vehicle presence information and foreign object information, the vehicle presence information indicating whether the charging space is vacant, and the foreign object information indicating whether the heat is detected in the charging space.

According to the present disclosure, a vehicle parking place where wireless charging can be performed is presented to allow a driver of an electric vehicle or the like to recognize the vacancy state of a charging space.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8A is a view of a screen on which the vacancy states of charging spaces based on vehicle presence information in the second embodiment are displayed in a list form in association with vehicle parking places;

FIG. 8B is a view of a screen on which the vacancy states of the charging spaces are displayed in a tabular form in association with the vehicle parking places;

FIG. 9A is a view of a screen on which the vacancy states of the charging spaces based on vehicle presence information and foreign-object information in the second embodiment are displayed in a list form in association with the vehicle parking places;

FIG. 9B is a view of a screen on which the vacancy states of the charging spaces are displayed in a tabular form in association with the vehicle parking places;

DETAILED DESCRIPTION

Embodiments of a chargeability presenting method and a chargeability presenting system according to the present disclosure will be described with reference to the accompanying drawings. The embodiments described below are merely examples of the chargeability presenting method and the chargeability presenting system according to the present disclosure. Therefore, it is to be understood that the scope of the present disclosure is defined by the wording in the claims with reference to the embodiments described below and is not limited to only the embodiments. Hence, of the constituent elements in the embodiments described below, the constituent elements not set forth in the independent claims that represent the broadest concept of the present disclosure are not necessarily needed to achieve an object of the present disclosure, but are described as constituting a more preferred mode.

The accompanying drawings are schematic drawings in which at least one of emphasis, omission, and adjustment in proportions is made as appropriate in order to illustrate the present disclosure and may differ in at least one of actual shapes, actual positional relationships, and actual proportions.

First Embodiment

Figure 1:
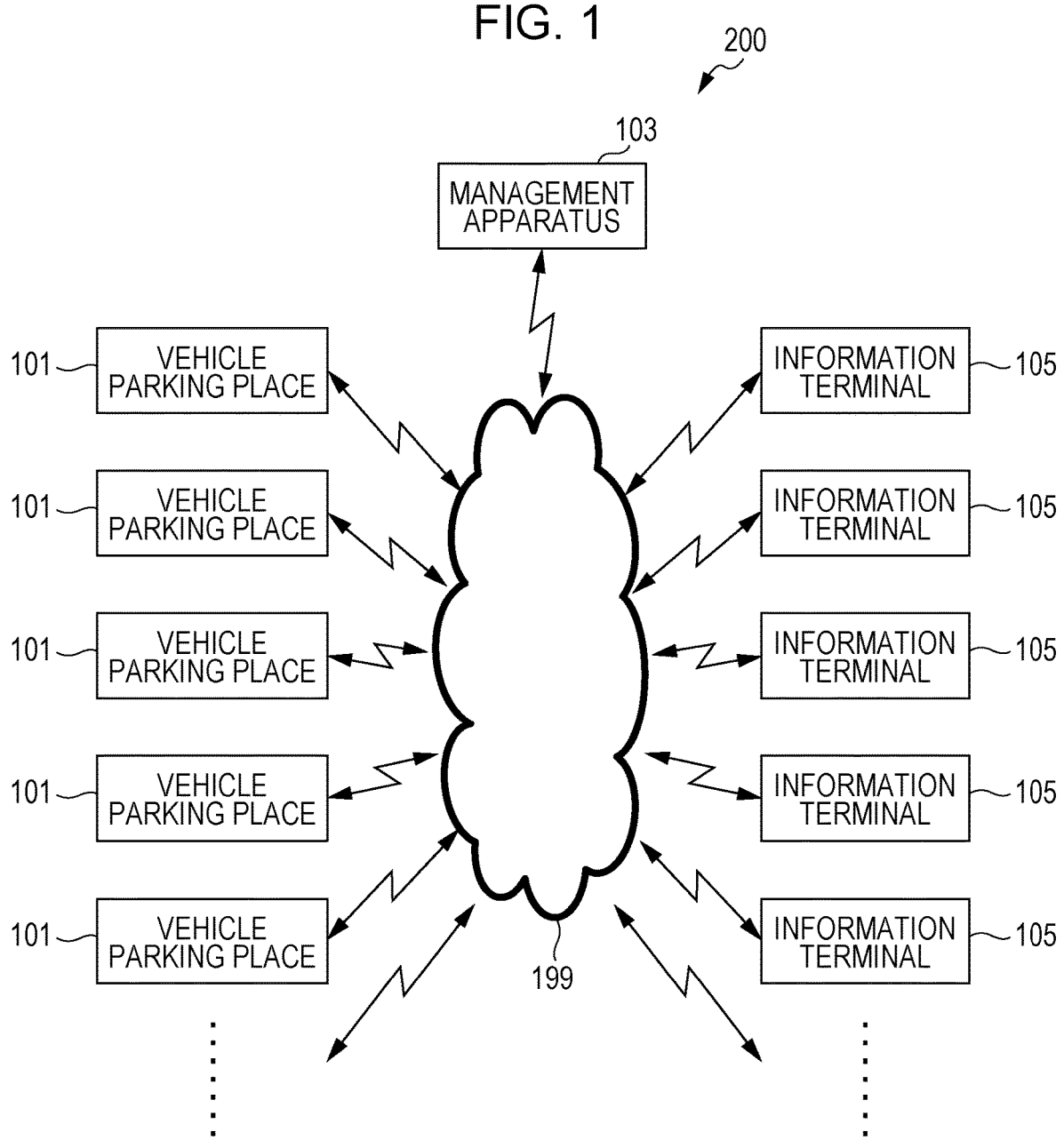
FIG. 1 is a diagram illustrating an overview of a vehicle parking place system in a first embodiment.

FIG. 1 is a diagram illustrating an overview of a vehicle parking place system in a first embodiment.

Figure 2:
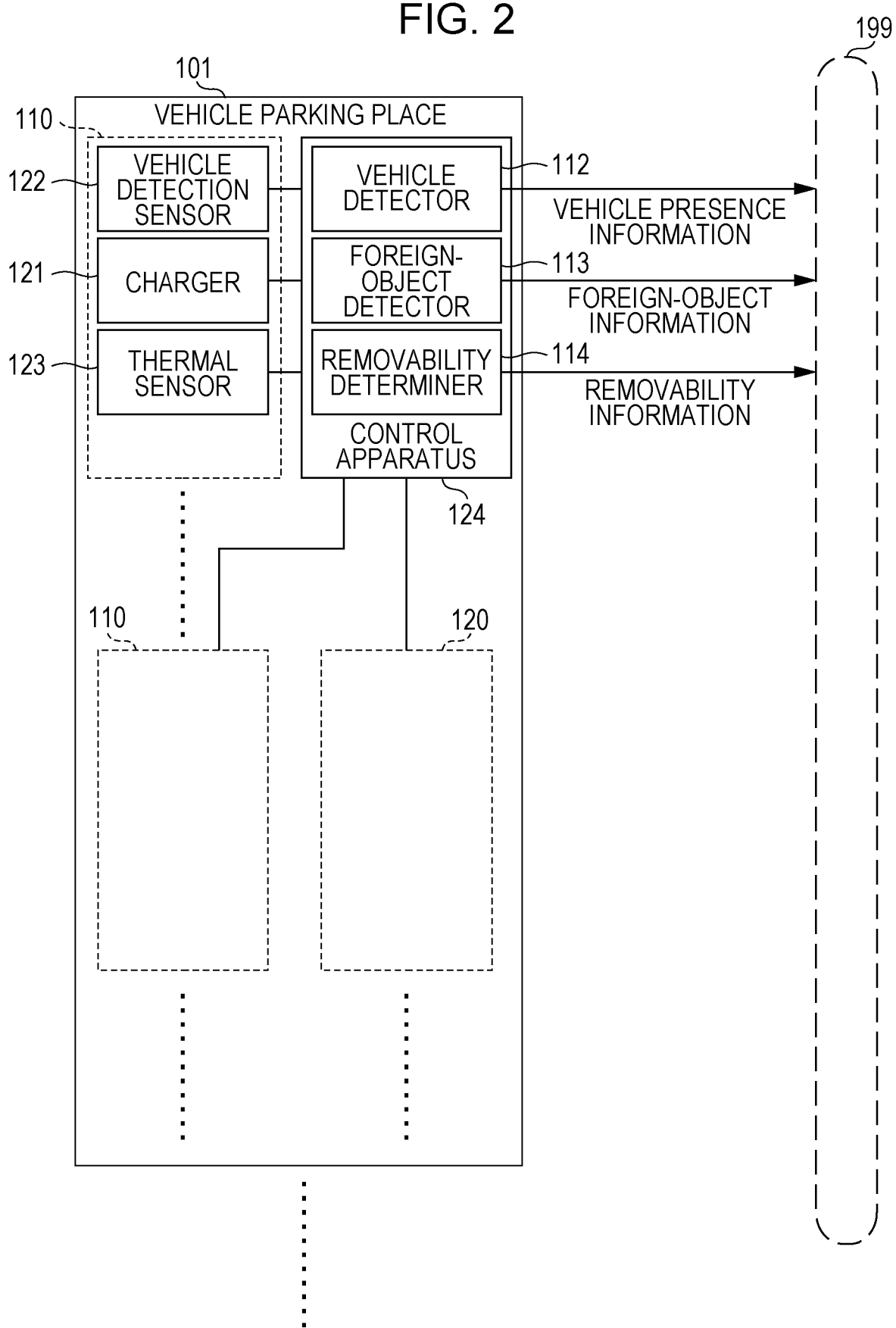
FIG. 2 is a block diagram illustrating a typical example of a functional configuration and a mechanism configuration of one vehicle parking place in the first embodiment.

FIG. 2 is a block diagram illustrating a typical example of a functional configuration and a mechanism configuration of one vehicle parking place in the first embodiment.

Figure 3:
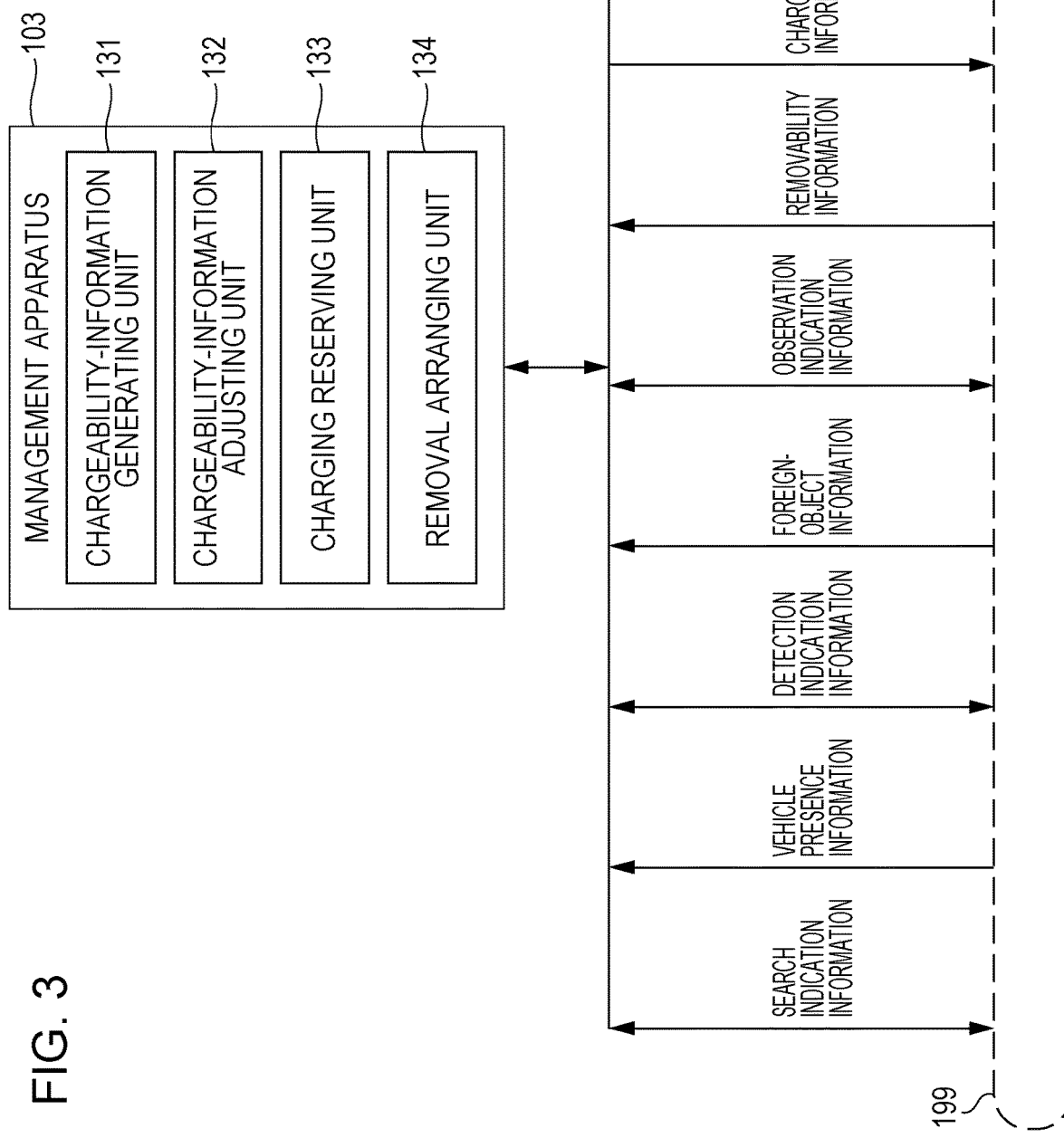
FIG. 3 is a block diagram illustrating a functional configuration of a management apparatus in the first embodiment.

FIG. 3 is a block diagram illustrating a functional configuration of a management apparatus in the first embodiment.

Figure 4:
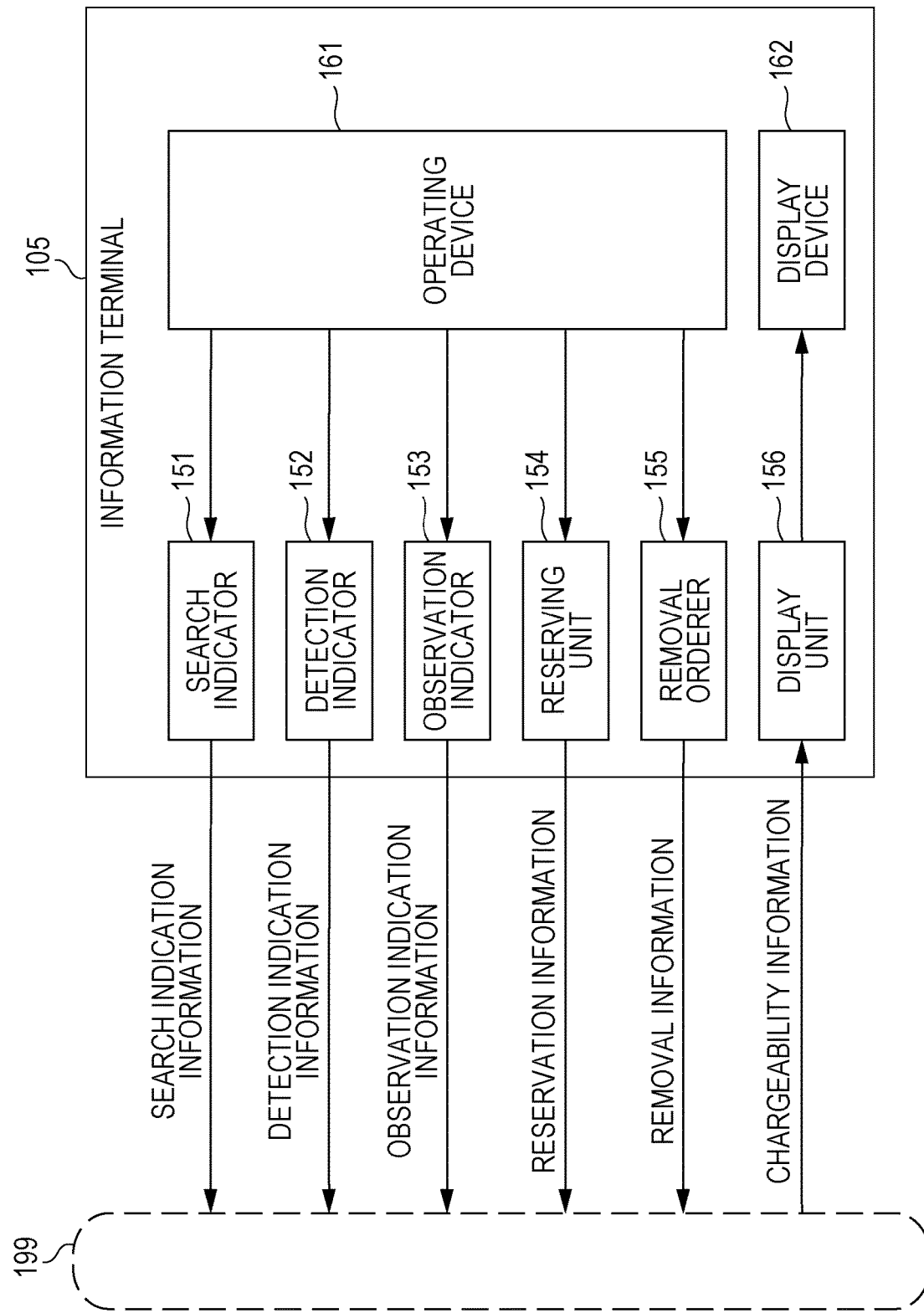
FIG. 4 is a block diagram illustrating a functional configuration of one information terminal in the first embodiment in conjunction with a mechanism configuration thereof.

FIG. 4 is a block diagram illustrating a functional configuration of one information terminal in the first embodiment in conjunction with a mechanism configuration thereof.

A vehicle parking place system 200 illustrated in FIGS. 1 to 4 includes one or more vehicle parking places 101 having charging spaces 110 where chargers 121 for wirelessly charging electric vehicles are installed, a management apparatus 103 that is connected to the one or more vehicle parking places 101 through a network 199 to manage the one or more vehicle parking places 101, and information terminals 105 that are connected to the management apparatus 103 through the network 199. The vehicle parking place system 200 has a chargeability presenting system.

As illustrated in FIG. 2, each vehicle parking place 101 is a facility having one or more charging spaces 110 where the chargers 121 for wirelessly charging electric vehicles that are parked are installed. In the example illustrated in FIG. 2, each vehicle parking place 101 includes a control apparatus 124, and each charging space 110 includes a vehicle detection sensor 122 and a thermal sensor 123, in addition to the charger 121.

Each vehicle parking place 101 may have one or more vehicle parking spaces 120 where vehicles including electric vehicles can be parked and the chargers 121 are not installed. The vehicle parking place system 200 may also include one or more vehicle parking places 101 having only the vehicle parking spaces 120.

Each charger 121 wirelessly supplies electric power to a power-supply device included in each electric vehicle in a contactless manner. Although the wireless power-supply system for the charger 121 is not particularly limiting, it may be implemented by, for example, a system for supplying electric power by causing magnetic-field coupling, electromagnetic-field coupling, or the like between the charger 121 and the power-supply device. The electric power supplied from the charger 121 charges a rechargeable battery included in the electric vehicle via the power-supply device.

Each vehicle detection sensor 122 can detect whether or not a vehicle is present in the corresponding charging space 110 or the corresponding vehicle parking space 120. In FIG. 2, each vehicle detection sensor 122 is provided in the corresponding charging space 110. Each vehicle detection sensor 122 may also be provided in the corresponding vehicle parking space 120.

A system by which the vehicle detection sensor 122 detects a vehicle is not particularly limiting and is implemented by, for example, an ultrasonic sensor or an optical sensor.

For example, when the presence of an electric vehicle is to be detected in response to communication establishment of the charger 121 with an electric vehicle, a communication apparatus corresponds to the vehicle detection sensor 122. The vehicle detection sensor 122 may be any sensor that can detect whether or not a vehicle is present in the corresponding charging space 110 or the corresponding vehicle parking space 120 and does not necessarily have to directly detect a parked vehicle. For example, when at least one of the charging spaces 110 and the vehicle parking spaces 120 is a coin-operated parking space, a vehicle may be detected depending on whether or not a parking meter is in operation or depending on the opening/closing of a boom gate for regulating passage of a vehicle.

Each thermal sensor 123 is a sensor for detecting, when a metallic foreign object other than an electric vehicle is present in a wireless power-supply region where the charger 121 can wirelessly charge an electric vehicle, heat generated from the foreign object owing to a power supply operation performed by the charger 121. In the case of the present embodiment, each thermal sensor 123 is an infrared sensor for detecting infrared rays resulting from heat production.

More specifically, each thermal sensor 123 may be a thermal camera that has infrared sensors in a matrix and that can acquire the shape or the like of a region that is producing heat, that is, a foreign object that is producing heat, owing to the power supply operation.

The heat detecting system for the thermal sensor 123 is not particularly limiting. The thermal sensor 123 may also be used as the vehicle detection sensor 122.

Each control apparatus 124 can input and output information through the network 199. The control apparatus 124 includes at least one of a device in which a microprocessor operates in accordance with instructions included in a computer program stored in a storage device to execute processes included in the chargeability presenting system and a hardware circuit that executes the processes. The control apparatus 124 includes a vehicle detector 112 and a foreign-object detector 113, which are processing units that are implemented by software or hardware. In the case of the present embodiment, the control apparatus 124 further includes a removability determiner 114.

The control apparatus 124 may be provided for each charger 121 or may be provided in the vehicle parking place 101 and be connected to the plurality of chargers 121 and so on.

The vehicle detector 112 is a processing unit that determines whether or not a vehicle is present in each charging space 110 in the vehicle parking place 101, based on a signal from the vehicle detection sensor 122, and that outputs at least vehicle presence information indicating whether or not a vehicle is present in the charging space 110.

The vehicle detector 112 may output the vehicle presence information by causing each vehicle detection sensor 122 to operate based on received search indication information or may output the vehicle presence information when a signal from the vehicle detection sensor 122 changes. The vehicle detector 112 may periodically output the vehicle presence information based on information from the vehicle detection sensor 122 at predetermined time intervals.

The foreign-object detector 113 is a processing unit that causes each charger 121 to attempt the power supply operation, that determines that a foreign object is present in the corresponding wireless power-supply region when heat is generated in the wireless power-supply region based on the result of the attempt, and that outputs foreign-object information indicating that a foreign object is present. The "attempt of the power supply operation" as used herein refers to a power supply operation that the foreign-object detector 113 causes each charger 121 to execute for detecting a foreign object and, specifically, for increasing the temperature of the foreign object to a temperature that can be detected by the corresponding thermal sensor 123. More specifically, for example, this power supply operation is milder than the normal power supply operation for charging an electric vehicle and is realized by reducing the electric power to be supplied or limiting the amount of power supply time to the amount of time in which a foreign object is detectable.

The foreign-object detector 113 may output foreign-object information by causing each charger 121 to operate based on received detection indication information or may output foreign-object information when a signal from the corresponding thermal sensor 123 changes. The foreign-object detector 113 may also cause each charger 121 to periodically attempt the power supply operation at predetermined time intervals and output the foreign-object information based on information from the corresponding thermal sensor 123.

The removability determiner 114 is a processing unit that outputs, when the foreign-object detector 113 determines that a foreign object is present in the wireless power-supply region, removability information indicating whether or not the foreign object is removable by human power, based on thermal image information from the thermal sensor 123, which is a thermo camera. Specifically, for example, the removability determiner 114 calculates the area of a region where the temperature is higher than or equal to a predetermined temperature. When the calculated area is larger than or equal to a predetermined first threshold, the removability determiner 114 outputs removability information indicating that a foreign object that is present in the corresponding charging space 110 is not removable, and when the calculated area is smaller than the first threshold, the removability determiner 114 outputs removability information indicating that the foreign object is removable.

The removability determiner 114 may also cause difficulty-level information indicating the difficulty level of removing a foreign object to be included in the removability information, based on a plurality of thresholds, such as a second threshold. A specific difficulty-level information creation method is described later.

The removability determiner 114 may perform image processing on thermal image information from the thermal sensor 123 based on received observation indication information and output removability information or may output removability information each time the foreign-object detector 113 detects a foreign object.

The management apparatus 103 is the so-called server, which is connected to the vehicle parking places 101 through the network 199 to manage at least one of the vehicle parking spaces 120 and the vehicle parking places 101 included in the charging spaces 110. In the case of the present embodiment, the management apparatus 103 includes a chargeability-information generating unit 131, a chargeability-information adjusting unit 132, a charging reserving unit 133, and a removal arranging unit 134, which are processing units in the chargeability presenting system. A microprocessor performs input/output of information through the network 199 and accumulation of the information and operates in accordance with a computer program to thereby realize the processing units.

The charging reserving unit 133 and the removal arranging unit 134 are described later in another embodiment.

By using a database in which a vehicle parking place identifier for identifying each vehicle parking place 101, location information indicating the location of each vehicle parking place 101, number-of-charging-spaces information indicating the number of charging spaces 110 in each vehicle parking place 101, and so on are associated with each other, the chargeability-information generating unit 131 generates chargeability information indicating chargeability in each vehicle parking place 101, based on the vehicle presence information and the foreign-object information output from each vehicle parking place 101.

The chargeability-information generating unit 131 may output search indication information to the vehicle parking places 101, based on received search indication information, obtain vehicle presence information as a response to the output search indication information, output detection indication information to the vehicle parking places 101, based on received detection indication information, and obtain foreign-object information as a response to the output detection indication information. The chargeability-information generating unit 131 may also periodically collect at least one of the vehicle presence information and the foreign-object information from the vehicle parking places 101.

The chargeability-information adjusting unit 132 adjusts the chargeability information that the chargeability-information generating unit 131 generates based on the removability information output from each vehicle parking place 101. More specifically, even if the foreign-object information indicating that a foreign object is present is received, when the foreign object is removable based on the removability information, the chargeability-information adjusting unit 132 assumes that the foreign object is absent and adjusts the chargeability information. Also, when the removability information includes the difficulty-level information, the chargeability-information adjusting unit 132 may adjust the chargeability information in accordance with the difficulty-level information.

The chargeability-information adjusting unit 132 may output observation indication information to the vehicle parking place 101, based on received observation indication information, and obtain removability information as a response to the output observation indication information. The chargeability-information adjusting unit 132 may also periodically collect the removability information from the vehicle parking place 101.

As illustrated in FIGS. 1 and 4, each information terminal 105 is an apparatus that is connected to the management apparatus 103 through the network 199 to present information indicating whether or not an electric vehicle can be charged in each vehicle parking place 101, based on the received chargeability information. The information terminal 105 is the so-called car navigation apparatus, smartphone, or the like. The information terminal 105 has an operating device 161 and a display device 162, which are human-machine interfaces. In the present embodiment, the information terminal 105 has the so-called touch screen in which a transparent touchpad, which implements the operating device 161, is superimposed on an obverse side of the display device 162. The information terminal 105 includes a search indicator 151, a detection indicator 152, an observation indicator 153, a reserving unit 154, a removal orderer 155, and a display unit 156, which are processing units in the chargeability presenting system and are realized by a processor executing a chargeability presenting program. A display unit may hereinafter be referred to as a display.

The reserving unit 154 and the removal orderer 155 are described later in another embodiment in conjunction with the charging reserving unit 133 and the removal arranging unit 134 in the management apparatus 103.

Figure 5:
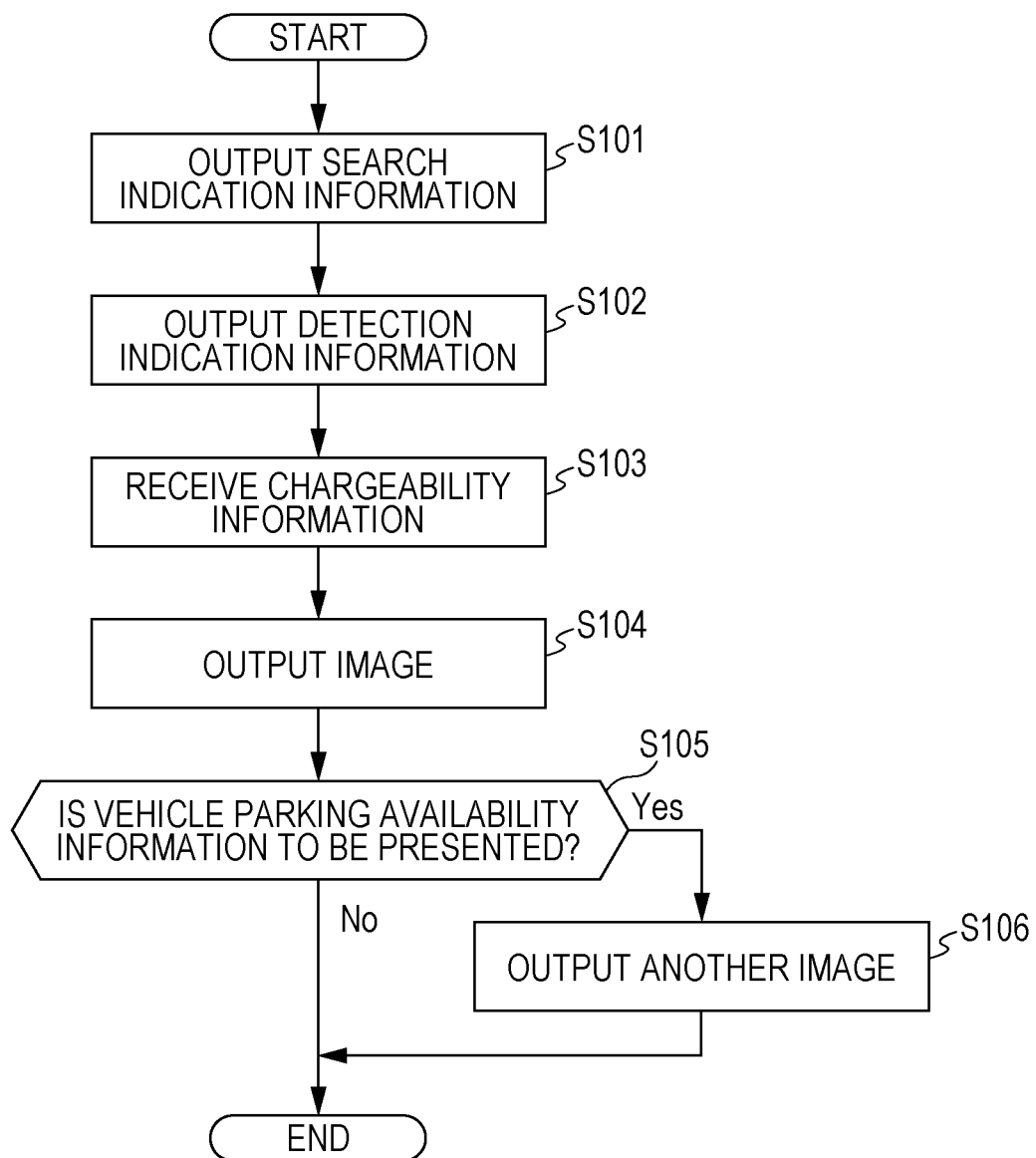
FIG. 5 is a flowchart illustrating the flow of processing performed by one information terminal in the first embodiment.

FIG. 5 is a flowchart illustrating the flow of processing performed by one information terminal in the first embodiment.

As illustrated in FIG. 5, the search indicator 151 outputs search indication information indicating that the vehicle parking places 101 where any of the charging spaces 110 is vacant are to be searched for (S101). The search indicator 151 may output the search indication information based on an input from the operating device 161 or may output the search indication information as initial setting when the chargeability presenting program is launched. The search indicator 151 may also output the search indication information as initial setting for a vehicle-parking-place guiding program for searching for the vehicle parking spaces 120 and the charging spaces 110.

In the present embodiment, a description will be given of a case in which the chargeability presenting program is incorporated into the vehicle-parking-place guiding program, and the search indicator 151 outputs the search indication information when the vehicle-parking-place guiding program is launched.

After S101, the detection indicator 152 outputs detection indication information indicating that the presence of a foreign object, other than a vehicle, in the wireless power-supply region in each charging space 110 is to be detected (S102). The detection indication information may be output in conjunction with the search indication information. Also, the detection indication information may be output upon input via the operating device 161.

Next, the display unit 156 receives chargeability information indicating the degree of chargeability in each vehicle parking place 101, the chargeability information being generated by the chargeability-information generating unit 131 in the management apparatus 103 based on vehicle presence information indicating whether or not a vehicle is present in each charging space 110, the vehicle presence information being obtained from the vehicle detector 112 in each vehicle parking place 101 as a response to the search indication information, and on foreign-object information indicating a result of an attempt to detect a foreign object on each charger 121, the foreign-object information being obtained from the foreign-object detector 113 as a response to the detection indication information (S103).

Figure 6:
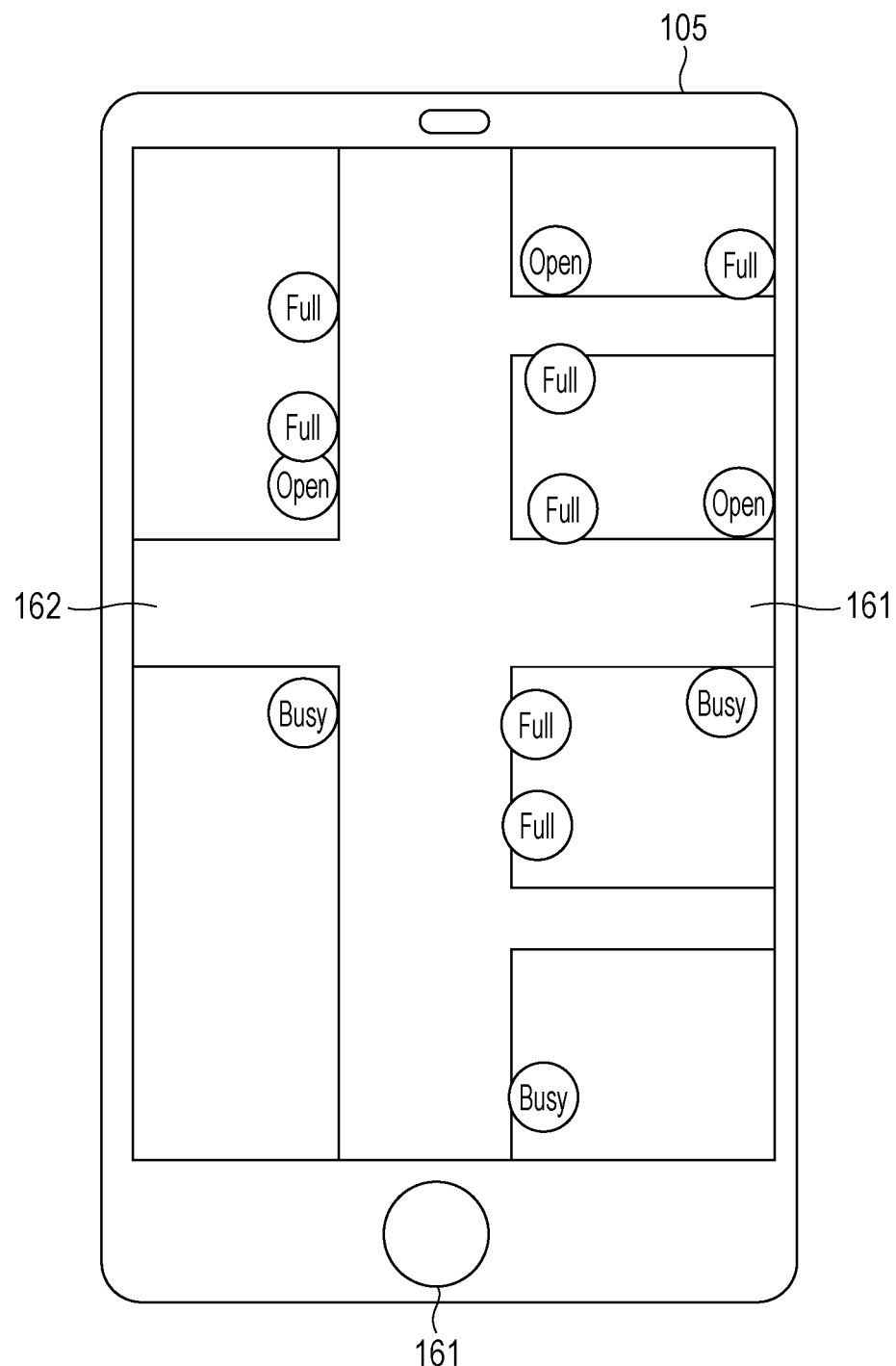
FIG. 6 is a view of a screen showing the locations of vehicle parking places and chargeability information, the screen being displayed on a display device in the information terminal in the first embodiment.

Next, when the charging space 110 where neither a vehicle nor a foreign object is present and wireless charging can be performed is not available in each vehicle parking place 101, the display unit 156 outputs a first image (an image in which "Full" is stated in a circle) indicating a first use state in association with the vehicle parking place 101, as illustrated in FIG. 6; otherwise, the display unit 156 outputs a second image (an image in which "Open" is stated in a circle) indicating a second use state in association with the vehicle parking place 101. In the case of the present embodiment, in addition, when a predetermined condition in a range in which the number of charging spaces 110 where wireless charging can be performed is neither zero nor all is satisfied in each vehicle parking place 101, the display unit 156 outputs a third image (an image in which "Busy" is stated in a circle) indicating a third use state in association with the vehicle parking place 101 (S104).

More specifically, for example, the vehicle presence information is treated as "0" when a vehicle is present in the corresponding charging space 110 and is treated as "1" when a vehicle is not present, and the foreign-object information is treated as "0" when a foreign object is present in the corresponding charging space 110 and is treated as "1" when a foreign object is not present. The chargeability-information generating unit 131 in the management apparatus 103 performs a calculation "vehicle presence information"*"foreign-object information" (* represents a multiplication) with respect to each of the charging spaces 110 in the vehicle parking place 101 of interest. Then, the chargeability-information generating unit 131 generates chargeability information indicating the first use state for the vehicle parking place 101 of interest when the total of the calculation results for the vehicle parking place 101 is 0, generates chargeability information indicating the second use state when the total of the calculation results is larger than or equal to, for example, a first predetermined value for the number-of-charging-spaces information indicating the number of charging spaces 110 in each vehicle parking place 101, and generates chargeability information indicating the third use state when the total is larger than 0 and is smaller than the first predetermined value.

When the information terminal 105 obtains the chargeability information from the management apparatus 103, the display unit 156 in the information terminal 105 causes the first, second, and third images corresponding to the respective pieces of chargeability information to be displayed on a map displayed on the display device 162 based on the location information of the vehicle parking places 101.

Next, if an input indicating that vehicle parking availability information indicating the use state of each vehicle parking space 120 is to be presented is received from the operating device 161 (Yes in S105), the display unit 156 switches the current image to an image corresponding to the vehicle parking availability information.

In this case, when the vehicle presence information includes information indicating that whether or not a vehicle is present is unknown owing to a failure in the vehicle detection sensor 122 or the like, the calculation may be performed assuming that the value is "0" indicating that a vehicle is present in the corresponding charging space 110. Also, whether the vehicle presence information is to be treated as "0" or "1" when the presence of a vehicle is unknown may be selected in accordance with an input via the operating device 161. When the foreign-object information includes information indicating that the detection is not possible owing to a failure in the thermal sensor 123 or the like, the calculation may be performed assuming that the value is "0" indicating that a foreign object is present. Also, whether or not the foreign-object information is to be treated "0" or "1" when the detection is not possible may be selected in accordance with an input via the operating device 161.

According to the first embodiment described above, the vehicle parking place(s) 101 where the charging space(s) 110 where wireless charging can be performed is (are) available and the vehicle parking place(s) 101 where the charging space(s) 110 where wireless charging can be performed is (are) not available can be presented to a user, for example, a driver of an electric vehicle. In particular, since the vehicle parking places 101 where charging can be reliably performed, excluding the charging spaces 110 where wireless power supply cannot be performed owing to metal foreign objects, can be presented, useful information can be provided to a user who desires to receive it. For example, it is possible to avoid a problem that although a vehicle can be parked in one of the vehicle parking spaces 120, the vehicle cannot be charged since there is no available charging space 110.

Although the chargeability in vehicle parking places 101 may be presented in two stages "Open" and "Full", the chargeability can also be presented in three stages, for example, "Open", "Busy", and "Full". Thus, the vehicle parking places 101 can be more finely presented, for example, the vehicle parking place 101 having high chargeability but being distant from the current location, the vehicle parking place 101 having lower chargeability but being close to the current location, and the vehicle parking place 101 having lower chargeability but being close to a destination or the like can be presented.

In addition, when uncertain information indicating "undetectable" is included in at least one of the vehicle presence information and the foreign-object information, it may be determined that a vehicle is not chargeable, thereby making it possible to present the vehicle parking places 101 where the chargeability is higher.

Although each information terminal 105 has been described above as displaying an image corresponding to the chargeability information by using the display device 162, each information terminal 105 may present the chargeability information to the user by means of sound or by means of both an image and sound.

Second Embodiment

Next, a description will be given of a second embodiment of the chargeability presenting system. Elements (portions) having at least one of an operation, a function, a shape, a mechanism, and a structure that are the same as or similar to those in the first embodiment may be denoted by the same reference numerals, and descriptions thereof may be omitted hereinafter. Points that differ from the first embodiment will be mainly described below, and a redundant description may be omitted.

Figure 7:
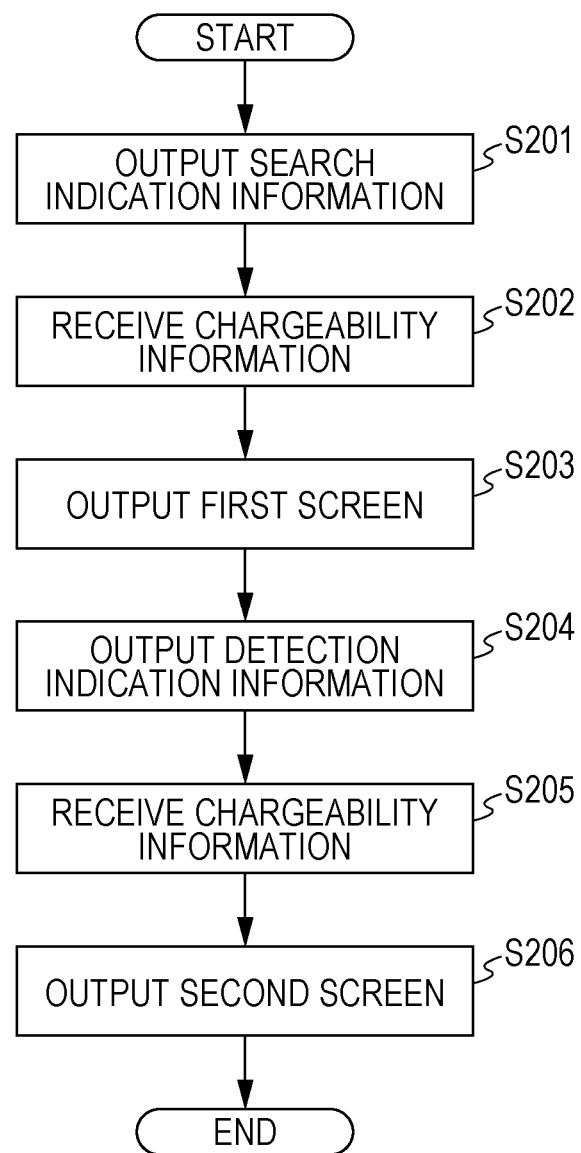
FIG. 7 is a flowchart illustrating the flow of processing performed by the information terminal in a second embodiment.

FIG. 7 is a flowchart illustrating the flow of processing performed by the information terminal in a second embodiment.

As illustrated in FIG. 7, the search indicator 151 outputs the search indication information indicating that the vehicle parking places 101 where any of the charging spaces 110 is vacant are to be searched for (S201).

Next, the display unit 156 receives the chargeability information that the chargeability-information generating unit 131 in the management apparatus 103 generated based on the vehicle presence information indicating whether or not a vehicle is present in each charging space 110, the vehicle presence information being obtained from the vehicle detector 112 in each vehicle parking place 101 as a response to the search indication information (S202).

Next, as illustrated in FIG. 8A, the display unit 156 outputs a vehicle parking place image in which the vehicle parking places 101 are identifiable in descending order (which may be in ascending order) based on the number of charging spaces 110 where charging can be performed, in conjunction with the first image ("Full"), the second image ("Open"), and the third image ("Busy") indicating the use states of the corresponding charging spaces 110 (S203). These images are displayed on one screen on the display device 162 as a first screen 171. A table in FIG. 8B illustrates the chargeability information generation by the chargeability-information generating unit 131 in the management apparatus 103.

After S203, when an input is received via the operating device 161, in the case of the present embodiment, when a position corresponding to a "Detect Foreign Object" button in the first screen 171 illustrated in FIG. 8A is touched, the detection indicator 152 outputs detection indication information indicating that the presence of a foreign object, other than a vehicle, in the wireless power-supply region in each charging space 110 is to be detected (S204).

Next, the display unit 156 receives the chargeability information that the chargeability-information generating unit 131 in the management apparatus 103 generated based on the previously obtained vehicle presence information and the foreign-object information obtained from the foreign-object detector 113 as a response to the detection indication information (S205).

Next, as illustrated in FIG. 9A, the display unit 156 outputs a vehicle parking place image in which the vehicle parking places 101 can be identified in descending order (which may be in ascending order) based on the number of charging spaces 110 where neither a vehicle nor a foreign object is present and charging can be performed, in conjunction with the images indicating the use states of the corresponding charging spaces 110 (S206). These images are displayed on one screen of the display device 162 as a second screen 172. In this case, the table in FIG. 9B indicates the chargeability information generated by the chargeability-information generating unit 131 in the management apparatus 103.

The first screen 171 may be displayed again when a position corresponding to a "Not Detect Foreign Object" button displayed on the second screen 172 is touched.

According to the second embodiment described above, in addition to the advantages of the first embodiment, the vehicle parking places 101 can be recognized in descending (or ascending) order of the chargeability (i.e., the possibility that charging can be performed), and the vehicle parking places 101 can be recognized by switching, for example, between the screen for a case in which the user wishes to charge a vehicle even it involves having to remove a foreign object and the screen for a case in which the user wishes to charge a vehicle as easily as possible.

Figure 10:
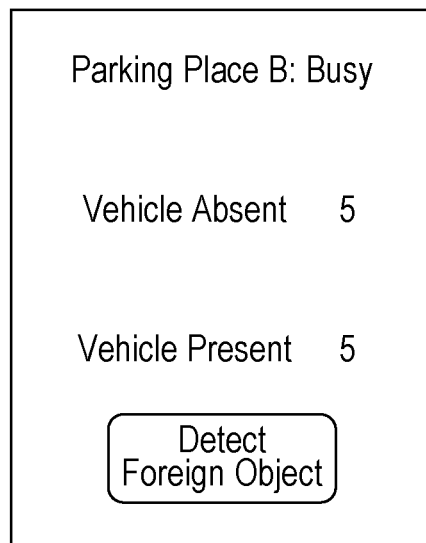
FIG. 10 is a view of a screen showing details of the chargeability information based only on the vehicle presence information for a designed vehicle parking place in the second embodiment.
Figure 11:
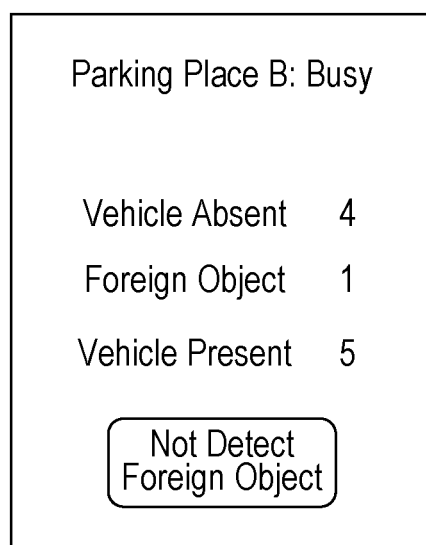
FIG. 11 is a view of a screen showing details of the chargeability information based on the vehicle presence information and the foreign-object information for the designated vehicle parking place in the second embodiment.

When the operating device 161 corresponding to the location of a desired vehicle parking place of the vehicle parking places 101 is touched in a state in which the first screen 171 is displayed on the display device 162 in the information terminal 105, the chargeability information for the desired vehicle parking place 101 may be shown in more detail, as illustrated in FIG. 10. Also, the chargeability information for the desired vehicle parking place 101, together with the foreign-object information, may also be shown in detail, as illustrated in FIG. 11, by touching the operating device 161 corresponding to the location of the vehicle parking place 101 displayed on the second screen 172.

In addition, the screen may be caused to transition to a chargeability-information display screen (illustrated in FIG. 11) including the foreign-object information by operating a "Detect Foreign Object" button displayed on the chargeability-information display screen (illustrated in FIG. 10) based only on the vehicle presence information or may be caused to transition to the previous screen by operating a "Not Detect Foreign Object" button.

Third Embodiment

Next, a description will be given of a third embodiment of the chargeability presenting system. Elements (portions) having at least one of an operation, a function, a shape, a mechanism, and a structure that are the same as or similar to those in the first and second embodiments may be denoted by the same reference numerals, and descriptions thereof may be omitted hereinafter. Points that differ from the first and second embodiments will be mainly described below, and a redundant description may be omitted.

Figure 12:
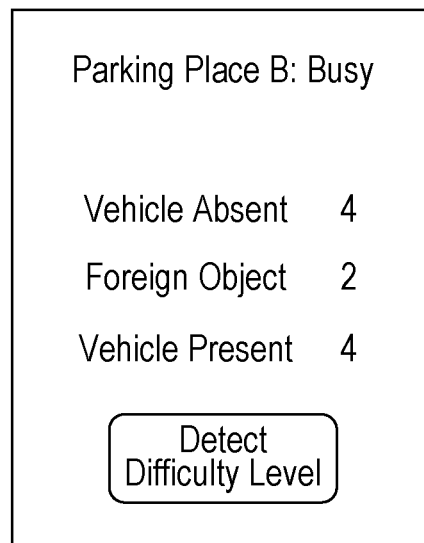
FIG. 12 is a view of a screen showing details of chargeability information generated without adding difficulty-level information in a third embodiment.

FIG. 12 is a view of a screen output by the display unit in a third embodiment.

Figure 13:
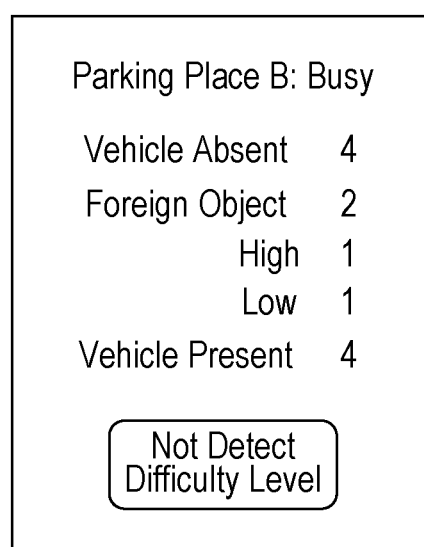
FIG. 13 is a view of a screen showing details of chargeability information generation by adding the difficulty-level information in the third embodiment.

As illustrated in FIG. 12, the display unit 156 outputs an image showing details of the chargeability information for a designated vehicle parking place of the vehicle parking places 101, as in the second embodiment. In the case of the present embodiment, a "Detect Difficulty Level" button is displayed on the displayed screen. When a position corresponding to the "Detect Difficulty Level" button displayed on the screen is touched, the display unit 156 outputs a fourth image (an image in which "High" is stated) indicating that the difficulty level of removing a foreign object is considerably high and a fifth image (an image in which "Low" is stated) indicating that the difficulty level of removing a foreign object is relatively low, in conjunction with the numbers of charging spaces 110 where the foreign objects having the respective difficulty levels are present, as illustrated in FIG. 13.

The difficulty level of removing a foreign object is determined, for example, in the following manner. The removability determiner 114, which is realized by the control apparatus 124 in each vehicle parking place 101, calculates the area of a region where the temperature is higher than or equal to a predetermined temperature, based on thermal image information from the thermal sensor 123, which is a thermo camera. The removability determiner 114 outputs removability information "not removable" indicating that a foreign object that is present in the corresponding charging space 110 is not removable when the calculated area is larger than or equal to a predetermined first threshold, and outputs removability information "removable" indicating that a foreign object is removable when the calculated area is smaller than the first threshold.

The removability determiner 114 may further cause the difficulty-level information indicating the difficulty level of removing a foreign object to be included in the removability information, based on a plurality of thresholds, such as a second threshold. For example, when the calculated area is larger than or equal to the first threshold, difficulty-level information indicating "Not Removable" indicating that a foreign object is not removable may be created; when the calculated area is larger than or equal to the second threshold and is smaller than the first threshold, difficulty-level information indicating "High" indicating that a foreign object is removable when a tool, such as a dolly, is used may be created; and when the calculated area is smaller than the second threshold, difficulty-level information indicating "Low" indicating that a foreign object is removable by only human power may be created.

According to this scheme, in addition to the advantages of the first and second embodiments, the user can select whether or not to remove a foreign object on his or her own. Thus, presenting the chargeability information according to the user's selection leads to an improvement in user convenience.

Fourth Embodiment

Next, a description will be given of a fourth embodiment of the chargeability presenting system. Elements (portions) having at least one of an operation, a function, a shape, a mechanism, and a structure that are the same as or similar to those in the first, second, and third embodiments may be denoted by the same reference numerals, and descriptions thereof may be omitted hereinafter. Points that differ from the first, second, and third embodiments will be mainly described below, and a redundant description may be omitted.

Figure 14:
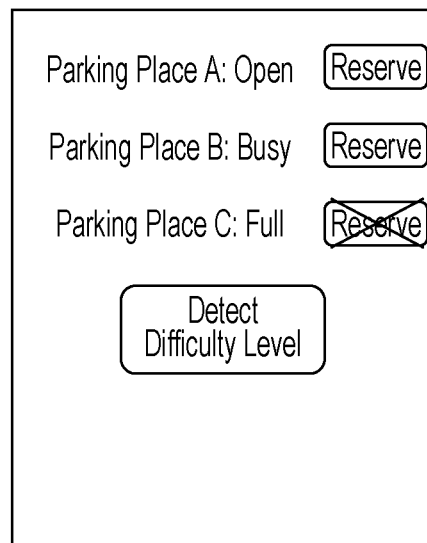
FIG. 14 is a view of a reservation screen displayed on the display device in the information terminal in a fourth embodiment.

FIG. 14 is a view of a reservation screen displayed on the display device in the information terminal in a fourth embodiment.

As illustrated in FIG. 14, the reserving unit 154 in the information terminal 105 outputs reservation information when a "Reserve" button displayed in association with the corresponding vehicle parking place 101 is operated using the operating device 161 (see FIG. 4). When the management apparatus 103 receives the reservation information, the charging reserving unit 133 therein outputs the reservation information to the corresponding vehicle parking place 101 (see FIG. 3).

Through the above-described processing, by reserving the charging space 110 in which charging can be performed, the user can save the vehicle parking place 101 where charge can be reliably performed, so that he or she can head to the vehicle parking place 101 with a sense of security.

Figure 15:
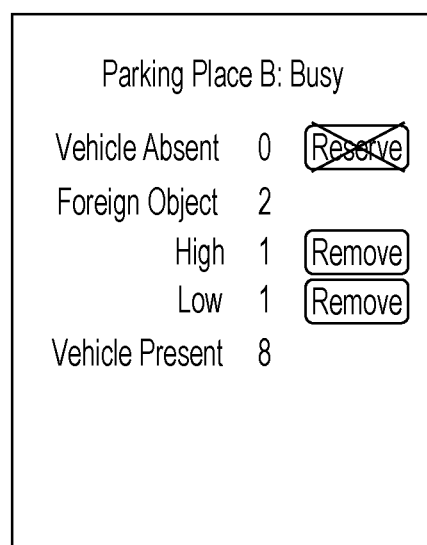
FIG. 15 is a view of a removal ordering screen displayed on the display device in the information terminal in the fourth embodiment.

In addition, a screen (as illustrated in FIG. 15) based on the difficulty-level information for removing a foreign object is displayed when a "Detect Difficulty Level" button displayed on the screen illustrated in FIG. 14 is operated using the operating device 161.

When a "Remove" button (as illustrated in FIG. 15) displayed in association with the difficulty level of removing a foreign object is operated using the operating device 161, the removal orderer 155 in the information terminal 105 outputs removal information (see FIG. 4). When the management apparatus 103 receives the removal information, the removal arranging unit 134 therein outputs removal information (see FIG. 3) to a foreign-object removal business operator that covers the corresponding vehicle parking place 101 (Parking Place B) in its service area.

Through the above-described processing, even only the charging space 110 where a foreign object is present is available, it is possible to reserve the vehicle parking place 101 where charging can be reliably performed, before an electric vehicle arrives at the charging space 110, by giving a request for removing the foreign object to the foreign-object removal business operator. It is also possible to enhance user convenience.

The above description has been given of a case in which the reservation information is output to the vehicle parking place 101 to reserve the charging space 110 where charging can be performed. In addition, the vehicle parking place 101 including the reserved charging space 110 can be set for a destination and driving assistance based on navigation can be performed utilizing the information terminal 105, or can be set for a destination for autonomous driving in cooperation with a vehicle.

The present disclosure is not limited to the above-described embodiments. For example, another embodiment realized by arbitrarily combining the constituent elements described hereinabove or by excluding some of the constituent elements may also be regarded as an embodiment of the present disclosure. The present disclosure also encompasses variations obtained by making various modifications conceived by those skilled in the art within a scope not departing from the spirit of the present disclosure, that is, not departing from the gist of the wording recited in the claims.

For example, the places where the processing units included in the chargeability presenting system are implemented are not limited to those in the above-described embodiments. For example, each information terminal 105 may be connected to the vehicle parking places 101 through the network 199 without provision of the management apparatus 103 and may, for example, generate and adjust the availability information.

The timing at which each processing unit outputs the information is not limited to that in the above-described embodiments, and the timing at which each processing unit outputs the information may be determined according to variable initial settings, an arbitrary operation on the operating device 161, or the like.

Also, although a case in which the vehicle parking places 101 where charging can be performed are presented has been described in the above-described embodiments, vehicle parking availability information regarding both the vehicle parking spaces 120 and the charging spaces 110 may be displayed through switching in order to present the vehicle parking places 101 where a vehicle can be reliably parked, in response to an explicit instruction from the user.

When charging is not needed, this function makes it possible to perform a wide search for vehicle parking spaces where a vehicle can be parked. Thus, the vehicle parking availability information can be switched according to the user's request, for example, extensive options can be presented to the user.

Also, the chargeability may be displayed through switching between two stages "Open" and "Full" and three stages "Open", "Busy", and "Full", may be displayed through switching between a case in which the chargeability information is generated based only on the vehicle presence information and a case in which the chargeability information is generated by adding the foreign-object information thereto, and may further be displayed through switching between a case in which the chargeability information is generated without adding the difficulty-level information and a case in which the chargeability information is generated by adding the difficulty-level information.

This makes it possible to present the chargeability through switching of the vehicle parking places 101 that suit the user's request.

Any of the presented vehicle parking places 101 may also be set for a destination in a navigation system through operation using the operating device 161. This makes it possible to perform road navigation to the vehicle parking place 101 where charging can be performed.

Also, after one of the information terminals 105 checks the chargeability information for one of the vehicle parking places 101 or the charging reserving unit 133 reserves one of the charging spaces 110 where charging can be performed, the corresponding foreign-object detector 113 performs foreign object detection or the corresponding vehicle detector 112 performs vehicle detection, and then chargeability information based on a most-recent foreign object situation may be newly generated and be presented to the user via the information terminal 105. With this scheme, when the charging space 110 that has been set becomes unavailable or when the charging space 110 that has a better condition in terms of a parking area, a fee, or the like becomes available, it possible to change the settings. It is possible to effectively notify the user of the change in the settings by adding sound or vibration to the notification.

Also, the operating device 161 included in each information terminal 105 is not limited to a transparent touchpad and may be implemented by a device that is operable by voice, a device that is operable by a human-body's operation, a device that is operable by movement of the eyes, or the like.

Not only are electric vehicles to be charged parked in the charging spaces 110, but also electric vehicles not to be charged and vehicles other than electric vehicles can be parked in the charging spaces 110.

Manufacturing, using, and/or selling a program for causing a computer to execute the processes included in the chargeability presenting system also corresponds to implementing the present disclosure. It goes without saying that manufacturing, using, and/or selling a recording medium on/in which the program is recorded also corresponds to implementing the present disclosure.

The present disclosure is applicable to a vehicle parking place system in which vehicle parking places and information terminals are connected through a network and is particularly applicable to at least one of a vehicle navigation system, a navigation system in a smartphone, and so on.

As described above, the present disclosure includes a chargeability presenting method and a chargeability presenting system described in the following items.

Item 1
    A chargeability presenting method using a vehicle parking place system, the vehicle parking place system including: a management apparatus that is connected to one or more vehicle parking places through a network to manage the one or more vehicle parking places and an information terminal that is connected to the management apparatus through the network, each vehicle parking place having a charging space where a vehicle including an electric vehicle is parkable and a charger for wirelessly charging the vehicle is installed, the method comprising:
    a search indicator outputting search indication information indicating that the vehicle parking place where the charging space is vacant is to be searched for;
    a vehicle detector outputting vehicle presence information indicating whether or not a vehicle is present in each charging space, upon obtaining the search indication information;
    a detection indicator outputting detection indication information indicating that presence of a foreign object, other than a vehicle, in a wireless power-supply region in each charging space is to be detected;
    a foreign-object detector attempting to detect a foreign object and outputting foreign-object information indicating a result of the detection, upon obtaining the detection indication information; and
    a display displaying, on a display device included in the information terminal, an image that is generated based on the vehicle presence information and the foreign-object information and that indicates a degree of chargeability in each vehicle parking place in a predetermined form.

Item 2
    A chargeability presenting method for one or more vehicle parking places each having a charging space, the method using an information terminal that is connectable to a network and that has a display device, the method comprising:
    a search indicator outputting search indication information indicating that a vehicle parking place where the charging space is vacant, a vehicle including an electronic vehicle being parkable in the vacant charging space, is to be searched for;
    a detection indicator outputting detection indication information indicating that presence of a foreign object, other than a vehicle, in a wireless power-supply region in each charging space is to be detected; and
    a display outputting an image indicating a degree of chargeability in each vehicle parking place in a predetermined form onto the display device, the image being generated based on vehicle presence information and foreign-object information, vehicle presence information being obtained as a response to the search indication information and indicating whether or not a vehicle is present in each charging space, foreign-object information indicating a result of an attempt to detect a foreign object in the wireless power-supply region, the foreign-object information being obtained as a response to the detection indication information.

Item 3
    The method according to Item 2,
    wherein, when the charging space where neither a vehicle nor a foreign object is present and wireless charging is possible is not available in each vehicle parking place, the display unit outputs a first image indicating a first use state in association with the vehicle parking place; otherwise, the display unit outputs a second image indicating a second use state in association with the vehicle parking place.

Item 4
    The method according to Item 3,
    wherein, when a predetermined condition in a range in which the number of charging spaces where wireless charging is possible is neither zero nor all is satisfied in each vehicle parking place, the display unit outputs a third image indicating a third use state in association with the vehicle parking place.

Item 5
    The method according to one of Items 2 or 4,
    wherein the display unit outputs a vehicle parking place image with which the one or more vehicle parking places are identifiable in ascending or descending order based on the number of charging spaces where charging is possible in each of the one or more vehicle parking places.

Item 6
    The method according to one of Items 2 to 5,
    wherein the detection indicator determines whether or not the detection indication information is to be output, based on an operation on an operating device included in the information terminal.

Item 7
    The method according to one of Items 2 to 5, further comprising:
    an observation indicator outputting observation indication information indicating that removability of a foreign object by using human power is to be observed, when it is determined that the foreign object is present, based on the foreign-object information; and
    receiving, as a response to the observation indication information, removability information indicating a result of an attempt to observe the removability of the foreign object,
    wherein the display unit outputs an image indicating a degree of chargeability in each vehicle parking place in a predetermined form, the image being generated based on the removability information in addition to the vehicle presence information and the foreign-object information.

Item 8
    The method according to Item 7,
    wherein, when the removability information includes difficulty-level information indicating a difficulty level of removing the foreign object,
        the display unit outputs a difficulty level image corresponding to the difficulty-level information.

Item 9
    The method according to one of Items 2 to 8, further comprising:
    a reservation indicator outputting reservation information indicating a reservation of the charging space in the vehicle parking place corresponding to the second image, based on an operation on an operating device.

Item 10
    The method according to one of Items 7 to 9, further comprising:
    a removal indicator outputting, upon receiving the removability information indicating that the foreign object is removable, removal information indicating that the foreign object is to be removed, based on an operation on an operating device.

Item 11
    A chargeability presenting system for a vehicle parking place system including a management apparatus that is connected to one or more vehicle parking places through a network to manage the one or more vehicle parking places and an information terminal that is connected to the management apparatus through the network, each vehicle parking place having a charging space where a vehicle including an electric vehicle is parkable and a charger for wirelessly charging the vehicle is installed, the chargeability presenting system comprising:

a search indicator that outputs search indication information indicating that the vehicle parking place where the charging space is vacant is to be searched for;

a vehicle detector that outputs vehicle presence information indicating whether or not a vehicle is present in each charging space, upon obtaining the search indication information;

a detection indicator that outputs detection indication information indicating that presence of a foreign object, other than the vehicle, in a wireless power-supply region in each charging space is to be detected;

a foreign-object detector that attempts to detect the foreign object and that outputs foreign-object information indicating a result of the attempt, upon obtaining the detection indication information; and a display that displays, on a display device included in the information terminal, an image that is generated based on the vehicle presence information and the foreign-object information and that indicates a degree of chargeability in each vehicle parking place in a predetermined form.

What is claimed is:

1. A chargeability presenting method, comprising:

before start of transmitting first electric power to an electric vehicle, wirelessly supplying second electric power to a charging space;

detecting whether heat is generated by a foreign object in the charging space after the second electric power is transmitted; and before start of transmitting the first electric power, presenting chargeability information that is generated based on vehicle presence information and foreign object information, the vehicle presence information indicating whether the charging space is vacant, and the foreign object information indicating whether the heat is detected in the charging space.

2. The method according to claim 1, wherein the second electric power is lower than the first electric power.

3. The method according to claim 1, wherein the second electric power is supplied before the electric vehicle is located on the charging space.

4. The method according to claim 1, wherein the first electric power is transmitted to the electric vehicle in a case where the presented chargeability information indicates that charging is allowable.

5. A chargeability presenting method for one or more vehicle parking places each having a charging space, the method comprising:

before start of transmitting first electric power for charging an electric vehicle, supplying second electric power to the charging space;

detecting heat generated by electric power in the charging space because of existing a foreign object other than a vehicle in a wireless power-supply region in the charging space;

outputting vehicle presence information indicating that a vehicle parking place where the charging space is vacant, a vehicle including an electric vehicle being parkable in the vacant charging space, is to be searched for;

outputting foreign object information indicating that presence of a foreign object, other than a vehicle, in a wireless power supply region in each charging space is to be detected; and presenting chargeability information in each vehicle parking place that is generated based on the vehicle presence information and the foreign object information before start of transmitting first electric power for charging the electric vehicle, wherein the first electric power is transmitted to the electric vehicle in a case where the presented chargeability information indicates that charging is allowable.

* * * * *